(No Model.)  W. S. KELLEY.  5 Sheets—Sheet 2.
BICYCLE.
No. 321,819.  Patented July 7, 1885.
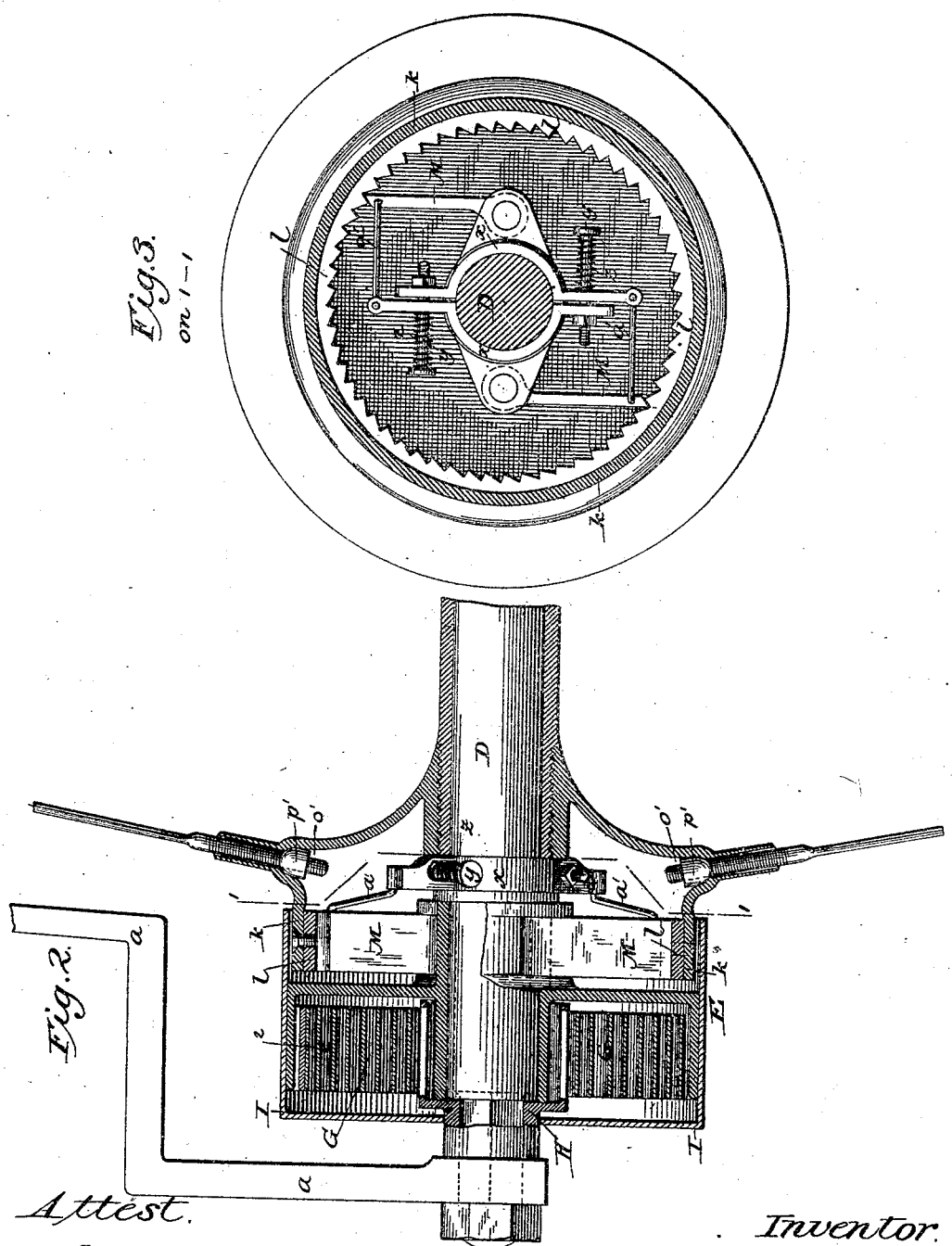
Attest.  
Sidney P. Hollingsworth  
Harry Shipley
Inventor.  
W. S. Kelley  
By his attorney  
Philip T. Dodge (No Model.) 5 Sheets—Sheet 3.
W. S. KELLEY.
BICYCLE.
No. 321,819. Patented July 7, 1885.
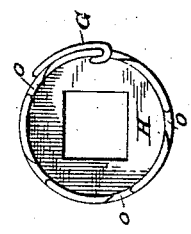
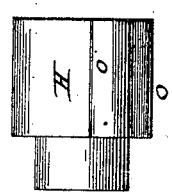
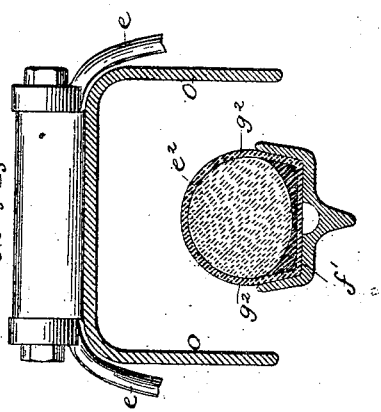
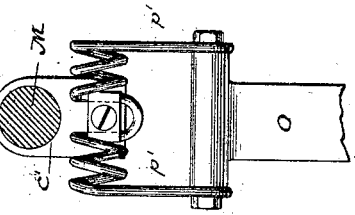
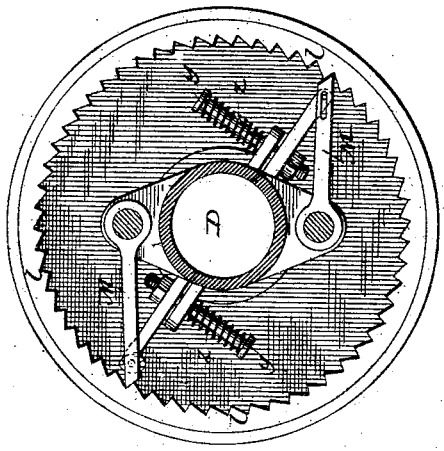
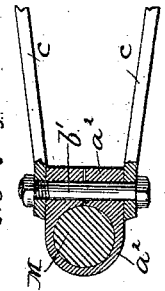
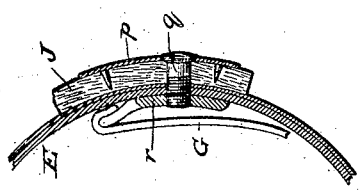
Attest.
Sidney P. Hollingsworth
Harry Shipley
Inventor.
W. S. Kelley
By his attorney
Philip T. Dodge (No Model.) 5 Sheets—Sheet 4.
W. S. KELLEY.
BICYCLE.
No. 321,819. Patented July 7, 1885.
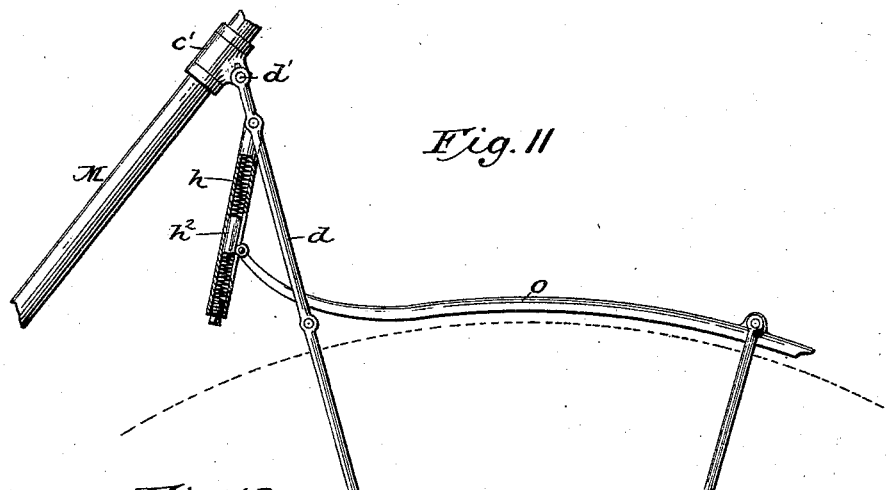
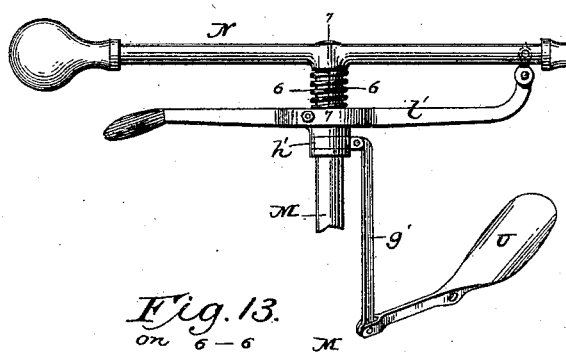
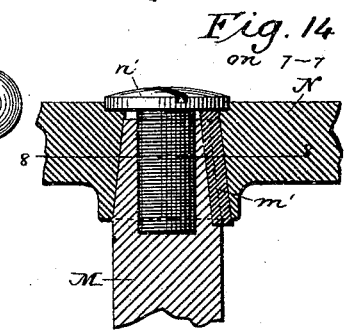
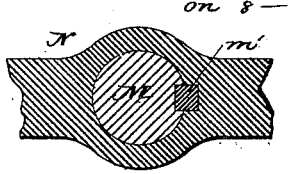
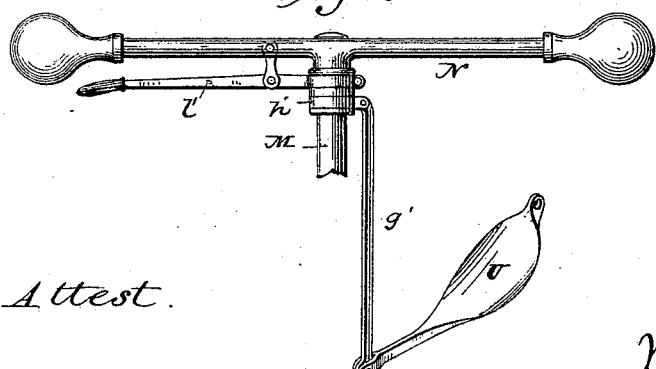
Attest.
Sidney P. Hollingsworth
Harry Shipley
Inventor:
W. S. Kelley
By his Attorney
Philip T. Dodge.

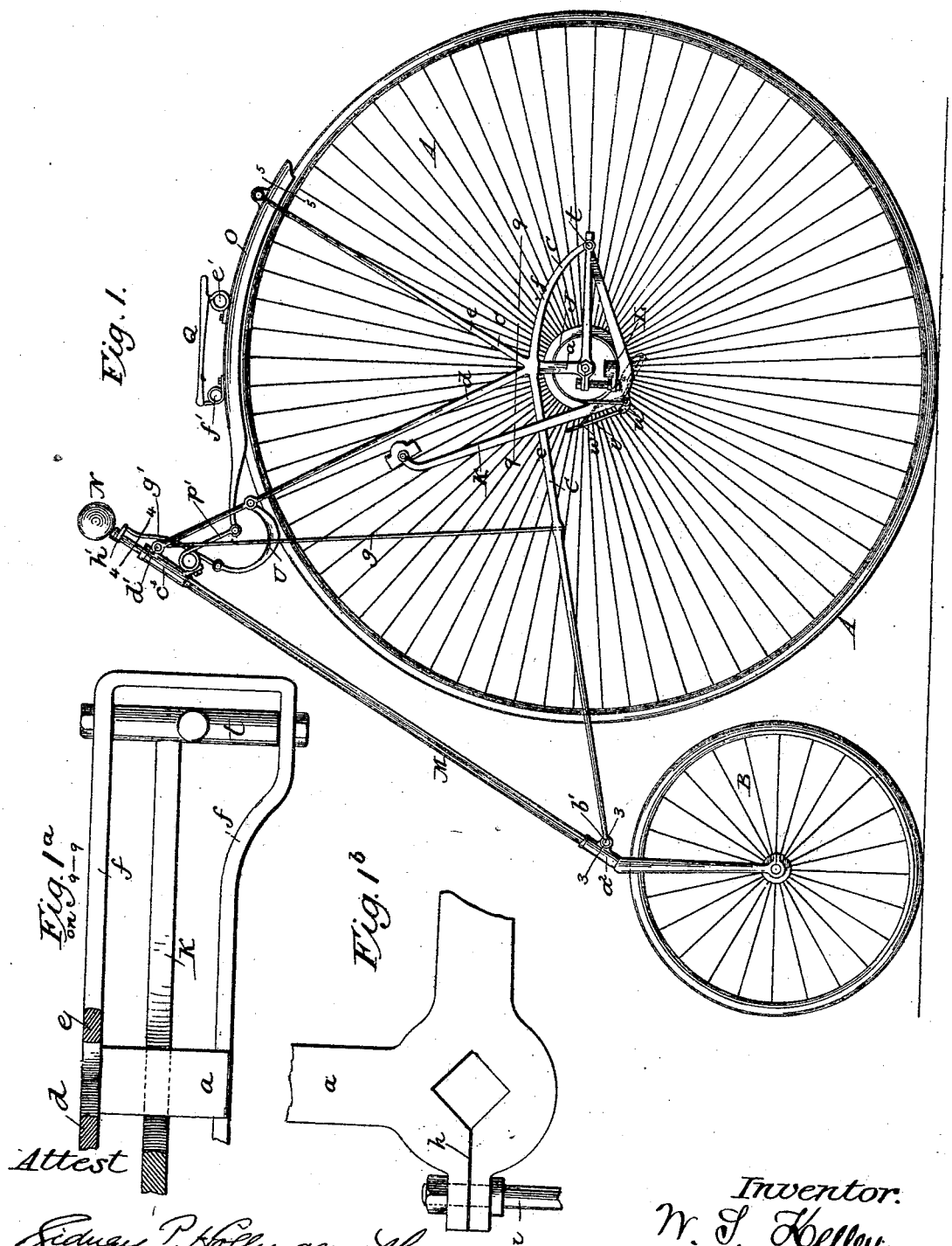

(No Model.) 5 Sheets—Sheet 5.

W. S. KELLEY.
BICYCLE.

No. 321,819. Patented July 7, 1885.

Attest
Sidney P. Hollingsworth
Harry Shipley

Inventor
W. S. Kelley
By his attorney
Philip T. Dodge

UNITED STATES PATENT OFFICE.

WILLIAM S. KELLEY, OF SMITHVILLE, NEW JERSEY.

BICYCLE.

SPECIFICATION forming part of Letters Patent No. 321,819, dated July 7, 1885.

Application filed February 7, 1884. (No model.)

*To all whom it may concern:*

Be it known that I, WILLIAM S. KELLEY, of Smithville, in the State of New Jersey, have invented certain Improvements in Bicycles and Tricycles, of which the following is a specification.

The present invention relates to improvements designed more particularly for application to that class of front-steering rear-driving machines which are manufactured under the patents granted to G. W. Pressey, Nos. 234,722 and 233,640, commonly known in the art as the "Star" machine, although, as will hereinafter appear, certain of the improvements are also applicable in machines of other styles.

The invention relates more particularly to improvements in the construction of the main frame; to an improved manner of arranging the pivoted foot-levers and connecting the same with the clutch mechanism of the driving-wheel; to means whereby the rider may instantly change the point at which the strap for driving the clutch is connected to the foot-lever, in order to enable the driver to apply increased power to the wheel; to an improved construction of the rim; to improvements in the construction of the elastic tire; to a saddle-support which is maintained by pendent supports, or otherwise arranged to have a limited forward and backward movement; to an improved device for connecting the clutch-springs with the axle and permitting their convenient change of tension; to means for automatically throwing the pawls of the clutch into and out of action, for the purpose of rendering the machine noiseless and of permitting it to be moved backward at will; to an improved manner of connecting the suspension-spokes to the hub of the wheel; to improved devices for operating the brake, and to a spring-saddle of peculiar construction.

Figure 17:
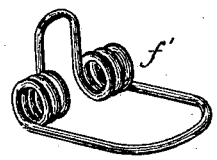
Figure 18:
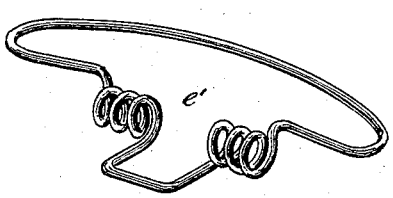
Figure 19:
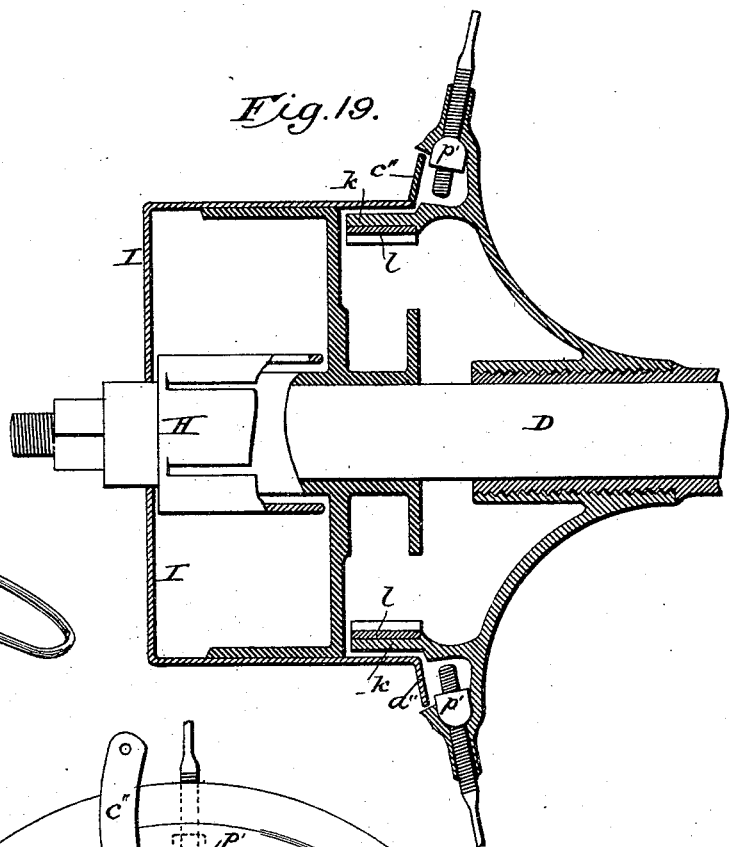
Figure 20:
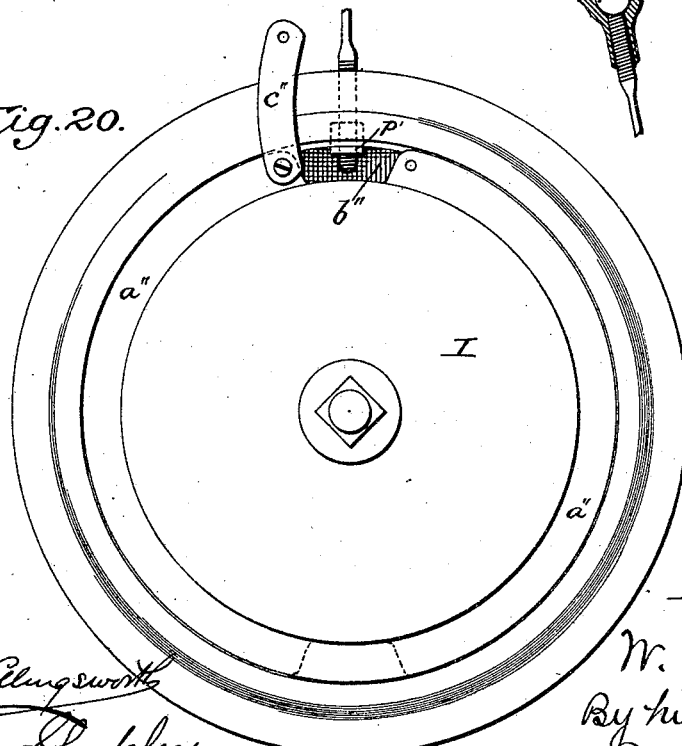

Referring to the accompanying drawings, Figure 1 is a side elevation of my improved machine. Fig. 1ᵃ is a section on the line 9 9 of Fig. 1, looking downward, and illustrating the form of the main frame. Fig. 1ᵇ is a side elevation of the axle-bearing in the main frame. Fig. 2 is a transverse central section through one side of the driving-wheel, frame, and the clutch mechanism. Fig. 3 is a cross-section on the line 1 1 of Fig. 2. Fig. 4 is a similar view illustrating the parts in a slightly modified form. Fig. 5 is an end and a side view of the collet by which the clutch-spring is connected to the axle. Fig. 6 is a view of the same in a modified form. Fig. 7 is a section on the line 2 2 of Fig. 2, illustrating the manner of connecting the spring to the box or body of the clutch. Fig. 8 is a cross-section on the line 3 3 of Fig. 1, showing the lower bearing of the steering-shaft. Fig. 9 is a sectional view, looking downward, on the line 4 4 of Fig. 1, showing the upper bearing of the steering-shaft and the connection of the seat-support therewith. Fig. 10 is a cross-section on the line 5 5 of Fig. 1. Fig. 11 is a side elevation illustrating in a modified form the devices for suspending the seat-bar from the frame. Fig. 12 is a front elevation of the steering-bar, the handle, and the attendant parts for operating the brake. Fig. 13 is a section on the line 6 6, looking downward. Fig. 14 is a vertical section on the line 7 7 of Fig. 12, showing the manner of connecting the steering-bar to the steering-shaft. Fig. 15 is a horizontal section on the line 8 8 of the preceding figure. Fig. 16 is a front elevation of the brake-connections in a slightly modified form. Fig. 17 is a perspective of the front saddle-spring. Fig. 18 is a perspective of the rear saddle-spring. Fig. 19 is a sectional view illustrating the preferred form of the hub of the wheel and the attendant parts for giving access to the inner ends of the spokes. Fig. 20 is a side view of the same.

Referring to the accompanying drawings, A represents the main driving-wheel; B, the forward steering-wheel, of relatively small size, and C the main frame by means of which the wheels are connected and the seat or saddle supported in essentially the same manner as in the original Pressey patents.

The main wheel A is of the well-known suspension type, consisting of a rim connected by laterally-diverging spokes to hubs on the opposite ends of an axle. This main axle is made hollow or tubular from end to end to admit a stationary axle, D, which is passed through the same and secured firmly at its ends in the sides of the main frame.

The main frame is composed of two parts or halves of similar size and form, applied on opposite sides of the main wheel, and united by the stationary axle and other transverse connections, as hereinafter explained. Each side of the frame is made in the form plainly represented in Figs. 1, 1ᵃ, and 2. An upright arm, *a*, in the lower end of which the end of the fixed axle D is secured, rises a short distance above the axle, and is then extended inward horizontally to a point near the wheel, where it unites with the four arms $c$, $d$, $e$, and $f$. The arm $c$ extends forward in a substantially horizontal position to receive the bearing for the lower end of the steering-bar, the arm $d$ upward and forward to receive the bearing for the upper end of the steering-shaft, the arm $e$ upward and rearward to sustain the rear end of the seat-support, and the arm $f$ backward and downward to receive the rear end of the foot-lever or treadle, which will be hereinafter described.

As shown in Fig. 1$^a$, the rear end of the arm $f$ is bent outward horizontally to pass around the rear end of the lever, and is then returned or extended forward, and united to the lower end of the arm $a$ at a point adjacent to the axle. It will be observed that by returning or doubling the arm $f$ in the manner described it is adapted to give support to both ends of the pivot by which the foot-lever is sustained.

The various arms of the frame are welded or otherwise permanently united, the entire side of the frame being thus composed of a single continuous piece.

In order to give the frame additional rigidity an upright rod or arm, $g$, is extended from the upper end of the arm $d$ directly downward to the arm $c$, to which it is riveted, welded, or otherwise securely attached.

It will be observed that by bending the upper ends of the arms $a$ inward the main portions of the frame are permitted to stand in close proximity to the sides of the wheel, while at the same time sufficient room is afforded between the arms $a$ and the hub of the wheel for the introduction of the clutch mechanism.

Heretofore difficulty has been experienced in securing and maintaining a firm connection of the fixed axle to the frame. To avoid difficulty in this regard I make one or both ends of the axle D of a square or other angular form to enter corresponding holes provided in the arms $a$. Each of these arms I provide with a narrow slit or opening, $h$, extending from the angular hole outward, as plainly represented in Fig. 1$^b$, and unite the same by a transverse bolt, $i$, by means of which the arm may be drawn together, so as to firmly embrace the axle. In practice it is found that this construction entirely overcomes the danger of the axle working loose in consequence of a constant vibration to which the parts are subjected when in action.

On one side of the machine, preferably the left, the bolt $i$ is extended downward, and provided at the lower end with a step, L, by means of which the rider is enabled to mount the machine. This step encircles the lower end of the bolt, and is secured by nuts applied above and below, as in Fig. 1, the nuts allowing a vertical adjustment of the step, as may be required.

Passing now to the mechanism for imparting motion to the wheel, it will be found to consist of foot-levers connected to straps winding on drums, which revolve loosely on the main axle, and which carry pawls arranged to engage with teeth on the main wheel. Springs serve to turn the drum backward when relieved from the strain exerted by the strap and treadle, thus elevating the treadle; but the depression of the treadle causes the straps to unwind and turn the drums in a forward direction, the drums in turn communicating motion through their pawls to the wheel.

In their general mode of action the parts resemble those in the original patent, but differ therefrom in various details of construction, which will now be explained. The main wheel has each of its hubs provided on the outside with an annular flange, $k$, inside of which there is secured by screws or otherwise a removable ring, $l$, provided with ratchet-teeth on its inner surface. This ring may be readily detached and replaced by another in the event of its being worn or otherwise injured. Being made separate from the hub, it may be made of steel or other metal, accurately finished, and highly hardened to resist wear.

On the end of the fixed axle D, between the hub of the wheel and the main frame, I mount a loosely-revolving drum or pulley, E, preferably constructed, as in Fig. 2, with a wide bearing on the axle. On the inner side of the drum I pivot, at points near the axle, two pawls or dogs, M, diametrically opposed to each other and arranged to engage at their outer ends with the toothed ring of the wheel. The outer side of the drum E contains an annular groove or recess, into which there is inserted a strong coiled spring, G, the outer end of which is connected to the rim of the drum, while the inner end is connected to a non-rotating collet, H, fixed upon the main axle D. When the drum or pulley is turned forward, the dogs impart a forward motion to the wheel and at the same time wind the spring. When the parts are released, the spring serves to turn the drum and pawls in a backward direction. The collet to which the spring is attached is preferably made of the form represented in Fig. 2, its outer end being adapted to fit closely on the square portion of the axle D, while its inner portion is made hollow or tubular to extend over and around the hub or sleeve of the rotary drum E. This construction is adopted in order that the drum E may be given a long bearing on the axle, as before alluded to. When this long bearing is deemed unnecessary, the collet H may be arranged to fit closely throughout its entire length upon the axle.

Heretofore it has been customary to fit the end of the spring firmly to the collet. This construction was attended with two evils; first, the difficulty of changing the tension of the spring, which could only be effected by disconnecting the parts and removing the collet to permit its rotation on the axle, and, second, the liability of the spring to be broken in the event of the wheel being turned backward. To avoid these difficulties I now construct the spring with a hook at its inner end, and provide the collet with a series of notches or shoulders, o, to engage with the spring, as plainly represented in Fig. 6. On turning the drum forward the spring will engage automatically with one or another of the shoulders, and this engagement will continue as long as the spring remains under tension. If it be required to increase the tension of the spring, it is only necessary to turn the drum which carries the same forward until the end of the spring rides from one notch or shoulder to another. This adjustment, which may be readily effected by hand after disconnecting the operating-strap, admits of the tension being quickly increased to any desired extent, and this without the necessity of disconnecting the parts of the clutch or gaining access thereto.

Fig. 5 illustrates the form of the collet when made solid instead of tubular, as before referred to. When the collet is tubular or hollow, the notches may be cut entirely through its periphery to receive the end of the spring; but when made solid, as in Fig. 5, the notches or shoulders are formed on the outer surface only. It is manifest that there may be any suitable number of shoulders to engage the spring, but in practice it has been found that five will answer an excellent purpose.

The foregoing parts of the clutch mechanism are inclosed and protected by means of a cup-like shell or casing, I, consisting simply of a disk fitted loosely over the axle with a peripheral flange extending over and around the pulley, and secured thereto by screws or otherwise. To the outer surface of this casing, which encircles the drum or pulley E and constitutes in effect a part thereof, is connected the strap J, by which the forward rotation of the parts is effected. The inner or rear end of this strap is preferably connected to the drum in the manner illustrated in Fig. 7. The strap is laid against the outer surface of the drum and covered by a plate, p, having lips or studs to enter the upper surface of the leather. One or more screws, q, are passed through the plate and the leather, and also through the periphery of the drum into a plate, r, applied to the interior of the drum, a single screw thus serving to hold the strap to the outside of the drum, and also to hold the plate upon the interior. One end of the plate r is curved inward, away from the inner surface of the drum, forming a hook or lip over which the outer hooked end of the coiled spring G engages, as represented. The strap is wound about the drum in a forward direction, and is connected at its forward extremity, by means which will be presently explained, to a foot-lever, K. This foot-lever, which is made of substantially an L form, extends downward in front of the drum, and thence backward thereunder to the rear extremity of the main frame, where it is mounted on a horizontal pivot, t, the two ends of which are sustained in the arm f, before alluded to, as plainly represented in Figs. 1 and 1ª. The pivot t is located directly in rear of the axle, and preferably in the same horizontal plane. It will be observed that as the lever is pivoted at its rear end and connected to the strap at its middle, while the power is applied at its forward end, the power or weight applied is immediately received upon the strap and transferred in part to the forward or rolling side of the drum. The rear end of the lever being urged upward by the power applied exerts an upward or lifting action on the main frame, thus relieving the main axle of a large portion of the weight and friction to which it would otherwise be subjected.

Practical experience has shown that the arrangement of the lever to the end named is of great advantage.

Referring to Fig. 1ª it will be seen that the rear end of the lever is widened to form a long bearing for the pivot-pin, this construction retaining the lever securely in its upright position and preventing it from being thrown sidewise by the pressure of the foot. The strap may be connected at its forward end rigidly to the lever in any suitable manner; but, inasmuch as it is desirable to have the power applied with increased effect to turn the wheel in mounting hills and riding sandy and rough roads, I provide an adjustable connection, whereby the point of attachment between the strap and lever may be instantly changed by the rider without dismounting. The movement of the connection backward toward the fulcrum of the lever gives an increased leverage, and vice versa. The adjustable connection may be modified in form; but I prefer to make use of the link u, having one end attached to the strap, and the opposite end pivoted to the lever in such manner that it may be swung forward and backward, the upward strain of the strap serving to hold it in either position in which it may be placed. The link may have its end inserted in a slot or groove formed for the purpose in the lever, or it may be forked to straddle the lever, as preferred. In those machines which admit of such construction being employed, a stud or arm may be formed on the end of the link in such position that the rider, by placing his foot directly thereon, may effect the forward or backward adjustment of the link, as demanded. In a machine of the present type, however, this lateral projection directly upon the link is not admissible, for the reason that it would encounter the step L. For this reason I provide a supplemental device for adjusting the link, this device being extended upward in close proximity to the lever in such position as not to encounter the step. The device consists simply of an arm, v, pivoted at its lower end to the extremity of the link, and jointed near its upper end to a second link, w, the lower end of which is pivoted to the lever. The upper end of the arm

*v* is bent laterally, as represented, in order to afford a bearing for the foot of the rider. The link being in its forward position, as in Fig. 1, a downward pressure of the foot upon the arm *v* has the effect of causing the link to swing backward to the position represented by dotted lines, thus changing the connection of the strap to a point nearer the fulcrum of the foot-lever. On the contrary, an upward pressure applied by the toe to the arm *v* will have the effect of swinging the link from its backward to its forward position.

It will be observed that the links *u* and *w* are arranged to stand at substantially right angles with each other. The effect of this arrangement and the connecting devices is to enable the operator to effect the movement of the link *u* more easily than would otherwise be possible, it being found in practice that notwithstanding the fact that the straps may be under a considerable tension, the movement of the link may be effected in either direction by the application of a very slight pressure.

While the devices represented herein are the best known to me at the present time for effecting the adjustment of the strap with respect to the lever, it is manifest that they may be modified in form in many respects, which will suggest themselves to the skilled mechanic, without departing from the spirit of my invention, which consists, broadly, in the combination, with the strap and the foot-lever, of an intermediate device whereby the connection between the strap and lever may be varied at will by a pressure of the foot and without the necessity of dismounting from the machine.

In the machine as originally constructed the pawls or dogs were maintained in engagement by means of springs, the result of which was, first, the production of an objectionable clicking sound as the pawls moved backward over the teeth, and, second, the fact that it was impossible to turn the wheel in a backward direction, which frequently rendered it inconvenient to move the machine when not in use. To avoid these difficulties I now provide a friction device connected with the pawls, whereby they are thrown positively into and out of engagement at the proper times. This device, which may be modified in its details, is preferably of the form represented in Figs. 2 and 3. A collar, *x*, divided through its center, is clasped around the fixed axle from opposite sides, and its two parts united by means of adjustable bolts or screws *y*, which are extended through and beyond one of the portions, and provided with spiral springs *z*. The springs and bolts serve to urge the two parts together around the axle with a yielding pressure, causing them to engage the axle with a moderate degree of friction. This frictional collar is provided with outwardly-extending arms the extremities of which are connected by links *a'* to the respective dogs or pawls in the manner plainly represented.

The action of the parts is as follows: When the drum or pulley E is turned in a forward direction by the straps and levers, the forward rotation of the outer ends of the pawls is immediately resisted by the links *a'*, which are held in position by the friction of the collar on the fixed axle. The result of this resistance is that the pawls are immediately caused to engage in the teeth of the wheel, and retained in engagement so long as the forward motion of the drum continues. The instant that the engagement occurs the pawls, overcoming the friction of the collar upon the axle, cause the collar and its arms and links to turn forward, the entire combination of parts rotating in a noiseless manner. The instant that the straps are released so that the drum starts in a backward direction under the influence of the spring G, the links *a'*, owing to the continued friction of the collar upon the axle, tend to resist the backward movement of the dogs, the effect of which is to cause the dogs to disengage instantly from the teeth and remain out of engagement during the entire backward rotation of the drum.

The above is the action of the parts when the machine is in operation. When the machine ceases its action and the parts resume their normal positions, the pawls are out of engagement with the wheel, and will thus remain until the drums are again turned forward to cause their engagement. It follows, consequently, that the machine may at any time be rolled in a backward direction at will. This will be found a matter of great convenience in moving the machine from place to place.

While it is preferred in ordinary cases to make use of the links *a'* between the frictional collar and the pawls, the arrangement represented in Fig. 4 may be substituted.

The collars, dogs, and springs are all constructed and arranged substantially as in the first device; but instead of employing the intermediate links the arms of the collar are arranged in such position as to engage directly with the outer ends of the pawls, with which they will be united by means of a pin and slot, as shown, or any other suitable sliding connection.

The operation of the device is substantially identical with that first described, the only difference being that the collar acts directly upon the dogs instead of through the links. So far as the engagement and disengagement of the pawls is concerned there is no difference.

Passing now to the forward wheel and the steering-shaft by which it is carried, it will be observed that the wheel has the ends of its axle mounted in arms which extend downward in a vertical or substantially vertical direction from the lower end of the steering-shaft M, which extends thence upward and backward in an inclined position to a point in advance of the rider's seat, its upper end being provided with a steering bar or handle, N, secured transversely and firmly thereon, so that by turning the handle the steering-wheel is deflected both horizontally and vertically in essentially the same manner as explained in the original patent. In the original machine the steering-bar was mounted in a single bearing at the lower end, and combined with an encircling spiral spring, in order that it might play endwise within the bearing in the event of the forward wheel encountering serious resistance, for the purpose of relieving the machine and rider from the shocks which would otherwise have been encountered. In my improved machine the necessity for this longitudinal movement of the shaft is avoided, and consequently I am enabled to dispense with the inclosing-tube and spring which were commonly employed. The lower end of the shaft, immediately above the fork in which the wheel is mounted, is carried in a sleeve or bearing, $a^2$, which is located between the arms $c$ of the main frame and secured firmly therein by means of a transverse bolt, $b'$, as plainly represented in Figs. 1 and 8. The bearing $a^2$ consists of a solid block bored out to fit closely around the journal of the shaft and split or divided on its rear side, through which the bolt $b'$ is passed, to the end that it may be contracted or compressed by tightening the bolt in such manner as to compensate for wear and insure a close fit upon the shaft. The bearing $c'$, at the upper end of the steering-shaft, is similar in construction to that at the lower end, and is united by a transverse bolt, $d'$, to the upper ends of the arms $d$ and $g$ of the main frame. It will be perceived that the two extremities of the steering-shaft are thus connected directly to the main frame, and that the transverse bolts $h$, which secure the bearings in place, serve the additional purposes of adjusting the bearings and of clamping the main frame firmly thereto.

The combination of the box in the manner described to admit of its adjustment is not a necessary feature; but the construction is preferred for obvious reasons.

It will be perceived that under my improved construction the steering-bar, connected at its two ends to the main frame, is made to serve in effect as a part of the frame, and to assist in giving the same the necessary strength and rigidity. In this connection the principal difference between my construction and that represented in the original Pressey patents lies in the fact that the steering-bar is made of greater length and connected at its two extremities with the frame. It will be perceived that in my frame the forward portion may be tied together by means of the steering-shaft alone, thus avoiding the necessity of a rigid front bar, which would otherwise be required.

In order to relieve the machine and the rider from the shocks which would otherwise be encountered in the event of the steering-wheel encountering a sudden resistance, as before alluded to, I now connect the seat or saddle with the other parts in such manner as to admit of its receiving a limited fore-and-aft motion. To this end I make use of a seat-supporting bar, O, located directly over the driving-wheel, its rear end being pivotally connected to the arm $e$ of the main frame, while its forward end is connected by a pendent swinging arm to the upper bearing, $c'$, of the steering-shaft or other portion of the main frame. The arm $p'$ may consist simply of a link pivoted at one end to the seat-bar and at the opposite end to a bearing on the main frame. It is preferred, however, to employ a suspension device which is elastic, and which will tend to resist the forward movement of the seat-bar. In Figs. 1 and 9 I have represented a suspension-spring, $p'$, consisting of a single piece of wire having its central portion formed into coils and its two ends extended downward and pivoted at their extremities to the seat-bar. The central coiled portion is secured to the shaft-bearing by means of a clip-plate and screw, as plainly represented in Fig. 9. The seat-bar stands normally in the position represented in Fig. 1. When, however, the machine encounters a resistance, or has its motion otherwise arrested suddenly, the spring-suspension device will yield and permit the seat-bar to move forward to a limited extent, the arm $e$ at the rear end possessing sufficient flexibility to follow the bar. The essence of the invention in this regard consists in connecting the seat-bar with the frame in such manner that it may play forward and backward to a limited extent, and that it shall resume its original position automatically, and it will be manifest to the skilled mechanic that the details may be modified in various respects without departing from the limits of the invention.

In Fig. 11 the seat-bar has its forward end pivoted to an ear on the side of a block, $h^2$, which is arranged to slide vertically in a tubular link, $h$, pivoted at the upper end to the frame. The link is slotted on one side in order that the ear on the slide may project through the same and play up and down therein. Within the link are mounted two spiral or other springs, one above and the other below the slide. The link permits the seat-bar to move forward and backward, while the springs permit it to play vertically with an easy action, in consequence of which the machine may be driven over rough roads without discomfort to the rider.

In practice it is found desirable to have the seat-bar located in close proximity to the periphery of the wheel; but it is important that it should be free from liability to bear upon the wheel under any circumstances which may arise. I therefore construct the seat-supporting bar of a form in cross-section as in Figs. 1 and 10. The bar thus formed may be given the necessary stiffness without undue weight.

In addition to the advantages above mentioned it possesses the further advantage of serving as a guard or shield to protect the rider from the dust and dirt which may escape from the periphery of the wheel.

Upon the seat-bar I mount an elastic saddle, Q, of the peculiar construction represented in Fig. 1. It consists of a pliable seat or saddle proper sustained at its two extremities, and strained longitudinally by means of coils $e'$ and $f'$. The form of these springs is plainly represented in Figs. 17 and 18. The forward spring consists of an arched portion having its two extremities coiled and extended horizontally for attachment to the supporting-bar. In practice it is found advisable to weld or otherwise unite these lower arms, thus producing an endless or continuous spring.

The spring $e'$ at the rear end of the saddle is similar in construction to that at the front, but differs therefrom in that its raised portion is extended backward and expanded laterally to conform to the rear end of the seat, which is of the same marginal form as those now in common use, its width being diminished from the rear to the front or horn.

The springs may be secured to the bar by means of clip-plates and nuts, so as to remain immovably in position. It is preferred, however, to attach them by devices which will admit of their being adjusted longitudinally of the bar—first, that the position of the saddle with respect to the wheel may be varied to suit the taste or requirements of individual riders, and, second, that the tension of the spring may be modified to increase or diminish the stiffness of the saddle.

Another part of my invention has reference to the construction of the metal rim of the wheel and to the elastic tire thereon. The rim is rolled in one continuous piece, of the sectional form represented in Fig. 10. It will be perceived that the outer surface of the rim contains a groove or cavity to receive the tire, and that this cavity is made with a flat bottom surface, and with upright side wheels, the faces of which are inclined slightly outward. In practice it is found that the groove of this particular form is advantageous, in that it causes the tire to be retained securely in position, and avoids the loosening of the cement by which the tire is retained in place. In this regard the rim is far superior to those having a groove of a semicircular or approximate forms, which cause the cement to become readily loosened in consequence of the tension and the lateral strains to which the tire is subjected.

The elastic tire as at present known in the art consists either of a homogeneous body of soft and elastic rubber, or of a soft body having a hardened surface applied on the outer side.

It is customary to apply tires of the kind first mentioned under a considerable degree of tension, the result of which is that whenever the outer surface is ruptured or cut in use the walls of the incision are immediately drawn apart. This action results in the rapid destruction of the tire.

In tires of the second class mentioned it is found impossible to apply them under the desired tension on account of the want of elasticity in the outer portion.

It is the aim of my improvement to provide a tire the outer surface of which shall be adapted to resist the cutting action of sharp stones and other objects with which it is liable to be brought in contact, and which shall at the same time be adapted for application under a high degree of tension, so that in the event of the failure of the cement there will be no danger of the tire being displaced.

To this end the improvement consists in a tire having its body composed of an outer portion of soft and highly-elastic rubber, and its inner portion composed of rubber possessing great strength and elasticity.

It further consists in combining with the tire a thin outer skin or coating of rubber treated in such manner as to be exceedingly tough, so that although it may yield readily, it will prevent the destruction of the inner and softer portion of the tire.

The form of my improved tire is plainly represented in Fig. 10, in which $e^2$ represents the body portion of the tire, of a circular or approximately-circular form, composed of a light and highly-elastic rubber. $f'$ represents the base portion of the tire, united to the body portion in the process of vulcanization or by suitable adhesive materials or compounds, the outer surface of the portion corresponding closely to the body with which it is intimately united. The inner surface will be made of a form corresponding with that of the groove or recess in the particular tire with which it may be employed. In the present instance the inner surface is flat, with edges inclining outward. This base portion is of a highly elastic and strongly contractile character, and is made shorter than the outer portion, or of such relative length in relation thereto that although the base portion may be under tension the outer portion will be free from tension, or practically so, so that if severed or punctured at the outer side it will have no tendency to gape open, as is the case with tires of ordinary construction. Reliance is placed mainly on the construction of this base, which is stretched upon the wheel to retain the tire in place.

Around the tire, constructed as above, I place an envelope or skin, $g^2$, consisting of a pliable and exceedingly tough rubber, which receives its support from the inner or body portion, but which at the same time serves to protect the body from injury. It is preferred to have this envelope inclose the base portion of the tire as well as the body, as by reason of its exceeding strength and toughness it is peculiarly adapted, when cemented to the rim, to retain the tire in place.

It is to be understood that in constructing the tire the body portion $e^2$ is to be arranged on the base in such condition or in such manner that, although the base may be stretched or subjected to a considerable tension when it is applied to the wheel, the outer portion shall be comparatively free from tension. Owing to this absence of tension there will be no tendency of the outer portion of the tire to open or spread in the event of incisions being made therein.

The tire as above constructed may be employed in connection with the rim represented without the employment of cement; but it is recommended that it be cemented securely to the rim in the usual manner.

In the construction of my tire the several portions above referred to may be produced by selecting appropriate compounds of rubber and subjecting them to a vulcanization adapted to the end in view.

Various methods being well known and commonly practiced in the art for the production of vulcanized rubber ranging from a state of extreme softness to a state of extreme hardness, it is deemed unnecessary to detail the same herein, inasmuch as any person skilled in the art is capable of exercising the ordinary skill and discretion in the selection and treatment of the material to give the same the qualities enumerated herein.

My invention relates rather to the selection and combination of different qualities of rubber, well known in the art, than to the treatment of the rubber to give it the required consistency.

In order to give the inner and outer portions different degrees of tension and elasticity, as above stated, the outer portion may be subjected to compression at the time that it is applied to the inner portion, or the inner portion stretched at the time it is applied to the outer layer.

For the purpose of arresting the motion of the machine, it is provided with a hand-brake to act on the main wheel.

As shown in Figs. 1, 12, and 13, the brake-shoe U is pivoted at its lower end to the arm $d$ of the main frame, and is pivoted at its upper end to a rod, $g'$, extending to a collar, $h'$, arranged to slide on the upper end of the steering-shaft. This collar is united by a swiveling connection to one end of a hand-lever, $i'$, having a pivotal connection at an intermediate point in its length with the steering-bar. By drawing upward from the outer end of the lever $i'$ the brake is caused to act upon the wheel.

It will be observed that the brake-lever is attached to and swings with the steering-bar, and that the swiveling action of the steering-bar and shaft in no wise interfere with the action of the brake.

If preferred, the brake-shoe may be pivoted at an intermediate point in its length, as shown in Fig. 12, and united to the middle portion of a hand-lever pivoted to the steering-bar.

For various reasons it is desirable to have the steering-bar united with its shaft securely, but in such manner as to be detachable. I therefore adopt the construction represented in Figs. 14 and 15. The upper end of the steering-shaft is made of conical form, and inserted into an opening of corresponding form in the steering-bar. The bar is fixed against rotation on the shaft by means of a key or spline, $m'$, and held down in place by means of a screw, $n'$, inserted into the upper end of the shaft and bearing on top of the bar.

Referring again to the friction device for throwing the pawl into and out of action, it should be stated that the friction-collar may be arranged to turn on a sleeve or projection on the hub of the wheel, instead of being mounted directly on the fixed axle; but the construction represented in the drawings is preferred.

In wheels of the present type having the rim carried by a series of wire spokes under tension, commonly known as "suspension" wheels, trouble is experienced in maintaining the tension of the spokes, the incessant vibrations of the machine causing them to work loose. To remedy this difficulty I attach the inner ends of the spokes to the hub in the manner plainly represented in Fig. 2. The hub has an annular groove or recess, $o'$, in its interior. The ends of the spokes are inserted loosely through radial holes in the hub, with their inner ends projecting through or into the groove. To their inner extremities nuts $p'$ are applied, as represented. The outer ends of the nuts are made spheroidal in form, whereby they are permitted to rock or tip to the slight extent which may be required in order to adjust them in the direction of the spoke. The advantage of this construction is that the nut is enabled to seat itself firmly at all times without danger of subjecting the spoke to a lateral or indirect strain. This construction avoids that frequent breakage of the threaded ends of the spokes of the character in which the nuts are seated immovably in place.

The groove to receive the nuts which hold the inner ends of the spokes may be formed within the flange $k$ of the wheel, as represented in Fig. 2, in which case it will be necessary to remove the clutch mechanism in order to gain access to the nuts. To avoid the inconvenience which would thus be occasioned, I propose to adopt in ordinary cases the construction represented in Figs. 19 and 20, the nut-receiving groove being formed in an annular flange overhanging the outer side of the hub, outside of and beyond the periphery of the drum. It will be observed that this construction admits of the nuts being reached from the outside of the drum, so that the spokes may be adjusted or removed without affecting any portion of the clutch mechanism.

As a convenient means of covering and concealing the nuts thus applied, I provide an external casing, I, which surrounds the drum, with a radially-extended flange or lip, $a''$, as plainly represented. At one or more points this flange will be cut away, as represented at $b''$, thus producing an opening through which the nuts may be reached. This opening may be located at the lower side and remain uncovered; but it is preferred to close the same by means of a plate, $c''$, pivoted, screwed, or otherwise attached to the casing.

While I have illustrated and described my various improvements with special reference to their use on a bicycle, it is to be understood that the clutch mechanism, the pedals, the rim, the tire, the saddle, and various other parts may be employed with equal facility and advantage on machines having three or more wheels, and that such of the features as are adapted for the purpose may be applied to two-wheel machines having rear steering-wheels, or having the large wheel in advance of the other.

It will also be understood that although I have mentioned herein straps as the means of connection between the levers and clutches, flexible connections of any suitable kind—such as cotton belts, elastic bands of metal, chains, or equivalent devices—may be employed.

Having thus described my invention, what I claim, is—

1. The frame-section for a bicycle, consisting of the arms $a$, $c$, $d$, $e$, and $f$, as described and shown.

2. In combination with the foot-lever, the main frame having the arm $f$ doubled or returned in the manner described, whereby it is adapted to support the fulcrum of the lever at both ends.

3. In combination with the main frame and axle, the step and the bolt $i$, adapted to serve the twofold purpose of sustaining the step and of contracting the frame upon the axle.

4. In a bicycle, the combination, with the main frame, of the pendent screw or bolt $i$, and the step L, adjustably secured upon said bolt by means of nuts.

5. In combination with the rear driving-wheel and its axle, the main frame mounted on said axle and provided with the arms $c$ and $d$, the bearings attached to the extremities of said arms, and the steering-shaft mounted in said bearings and fixed against end motion therein.

6. In a bicycle, the combination of the rigid main frame, the rear wheel mounted therein, the forward steering-wheel, and the inclined steering-shaft connected at its two extremities to the main frame, and serving in effect as a front bar for said frame to impart the requisite strength and rigidity thereto.

7. In combination with the rear driving-wheel, the main frame, the front steering-wheel, the steering bar or shaft mounted in fixed bearings on the main frame, and the seat-supporting bar mounted, substantially as described and shown, to move bodily forward with respect to the frame and to return automatically to its normal position.

8. In a machine comprising a main frame, and sustaining-wheels therefor, a seat-supporting bar connected to the frame at its forward end by means of a pendent link, and at its rear end by an upright yielding arm, as described and shown.

9. In a bicycle, two ground-wheels, in combination with a connecting-frame, whereby a fixed distance is maintained between the wheels, and a seat-supporting bar movable bodily forward and backward upon the frame, said bar being supported in substantially the manner described, whereby it is adapted to resume its normal position automatically.

10. In a bicycle or similar machine, a wheeled frame, and a seat or saddle supported at its two ends by yielding devices, adapted to permit the saddle to move freely forward and backward in relation to the frame and wheels.

11. In combination with the main frame, the rear driving-wheel, and the forward steering-wheel of relatively small size, the seat-supporting bar pivoted at its rear end to the arm of the frame, and connected at its forward end to the frame by means of a pendent link or support.

12. In combination with the main frame, the driving-wheel, and the steering-wheel, the seat-supporting bar $o$, jointed at its rear end to an arm of the main frame, and a spring, $p$, connecting the forward end of said bar with the main frame, substantially as described and shown.

13. In combination with the fixed axle, the driving-wheel revolving thereon, the rotary drum or pulley revolving independently on the axle, the connecting-pawls, and a frictional collar connected with the pawls, substantially as described, whereby the pawls are thrown positively into and out of action.

14. In a bicycle or similar machine, the combination of a driving-wheel, an independently-revolving drum, intermediate pawls connecting said parts, a spring to turn the drum in a backward direction, a strap and treadle to turn the same in a forward direction, and a collar having a frictional engagement with a support independent of the pawl-carrier, and arranged to act upon the pawls for the purpose of swinging the same into and out of engagement, substantially as described and shown.

15. In combination with the non-rotating axle, the driving-wheel provided with a toothed rim or flange, the independently-revolving drum provided with pawls to engage the rim, the divided collar confined by spring-pressure upon the axle, and a connection between said collar and the pawls.

16. In a bicycle, the combination of a foot-lever or pedal, a driving-wheel, a strap for operating said wheel, and intermediate devices connecting the strap and lever movable to and from the fulcrum of the latter, and devices adapted to be operated by the foot of the rider for changing the position of the connecting devices.

17. In a bicycle, the combination of the foot-lever and the wheel-operating strap with the connecting-link arranged to swing forward and backward, substantially as described.

18. In a bicycle, the combination, with a driving-wheel, of an operating-strap, a lever to actuate said strap, and a swinging connection between the strap and lever provided with a projection to be moved by the foot of the operator, whereby an instantaneous adjustment of the connection may be effected.

19. The drum and the spring tending to revolve the same in a backward direction, in combination with the operating-strap, the lever, and the swinging link $u$, whereby the point of connection between the lever and strap may be changed at will and the adjustment maintained by the tension of the strap.

20. In combination with the strap and lever, the swinging link $u$, the secondary link $w$, and arm $v$.

21. The axle and the revolving drum or pulley, in combination with the spring $g$, having a hooked inner end, and the stationary collet provided with a series of shoulders or notches to receive the end of the spring.

22. In combination with the axle and spring, the stationary collet H, made of hollow or tubular form, and the drum or pulley E, having its journal extended around the axle within the collet.

23. In combination with the drum having a plate or hook, $r$, in its interior, the spring $g$, having a hooked outer end to engage therewith.

24. In combination with the drum or pulley, the internal spring, and its holding-plate $r$, the external strap and its holding-plate $p$, and the screw or screws $q$, applied as described and shown.

25. In combination with the driving-wheel having the annular flange $k$, the drum or pulley provided with pawls to drive the wheel, and the internal shell or casing applied, as shown, to encircle the hub and flange, whereby the parts are concealed and protected.

26. In combination with the supporting-bar, the flexible seat or saddle and the independent supporting-springs $e'$ and $f'$, each consisting of a coiled portion having one extremity secured to the bar, and the opposite extremity attached to the saddle.

27. In combination with the flexible seat or saddle, the supporting-springs $e'$ and $f'$, each consisting of a continuous or endless wire having coils formed therein.

28. The improved rim for a bicycle-wheel, having in its outer surface the groove with the flat seat and outwardly-inclined sides.

29. The improved rim for a bicycle-wheel, having in the outer surface a groove with a flat bottom and flaring sides, and also having on the back the central rib, substantially as shown.

30. In an elastic tire for bicycle and other wheels, the combination of a central body of light and highly-elastic rubber and an exterior skin or coating of thin tough rubber, combining the qualities of pliability and of relatively-great tensile strength.

31. The combination, with a wheel, of an elastic tire consisting of an inner portion applied under tension to act with a contractile effect on the wheel, and an outer portion connected firmly to the inner portion and free from or under relatively low tension, whereby the tire is retained firmly in position upon the wheel, but prevented from opening in the event of its surface being cut or ruptured.

32. In combination with a wheel, an elastic tire consisting of inner and outer portions, the inner portion being under high tension and the outer portion free from tension or under relatively low tension.

33. In an elastic tire for road-wheels, the combination of a base portion of highly-contractile rubber, an outer portion of light elastic rubber, and a thin covering or envelope of relatively-tough rubber, as described.

34. In combination with the steering-shaft and the main frame-sections, a divided box or bearing for said shaft, connected to the frame by means of a transverse bolt, substantially as described.

35. In a bicycle, the combination, with the main wheel, of a seat-supporting bar located directly thereover, said bar constructed of a ∩ form in cross-section, as and for the purpose described.

36. In combination with the main frame and the wheel fixed therein, the brake-shoe, the rotary steering-shaft and its handle, and the brake-operating lever pivoted to and swinging with the handle and united by a swinging connection with the brake.

37. In combination with a clutch mechanism for driving the same, a suspension-wheel having the inner ends of its spokes secured to the hub at a point outside of or beyond the periphery of the clutch mechanism, whereby access is afforded to the inner end of the spokes.

38. In combination with the clutch mechanism having pawls to engage the wheel, the wheel provided with the overhanging toothed flange, and also with the spoke-receiving flange outside of or beyond the first-named flange.

39. In combination with the wheel having the annular flange $a''$, with the spoke-retaining nuts applied to its inner surface, the shield or casing I, provided with a flange to cover and conceal the nuts.

40. In a bicycle, the combination of a main frame, a rear wheel mounted in fixed bearings in said frame, a steering shaft or rod with a forward and backward inclination, mounted in bearings in the front of said frame and fixed against end motion therein, a steering-wheel mounted in a substantially-vertical fork on the lower end of said shaft, a steering bar or handle applied to the upper rear end of the shaft, a brake mounted on the main frame, a brake-operating lever located adjacent to and arranged to turn with the steering-handle, whereby the brake and the steering-wheel may be controlled without interference with each other.

WILLIAM S. KELLEY.

Witnesses:
E. F. BURNS,
E. H. BURTIS.